United States Patent Office 3,093,358
Patented June 11, 1963

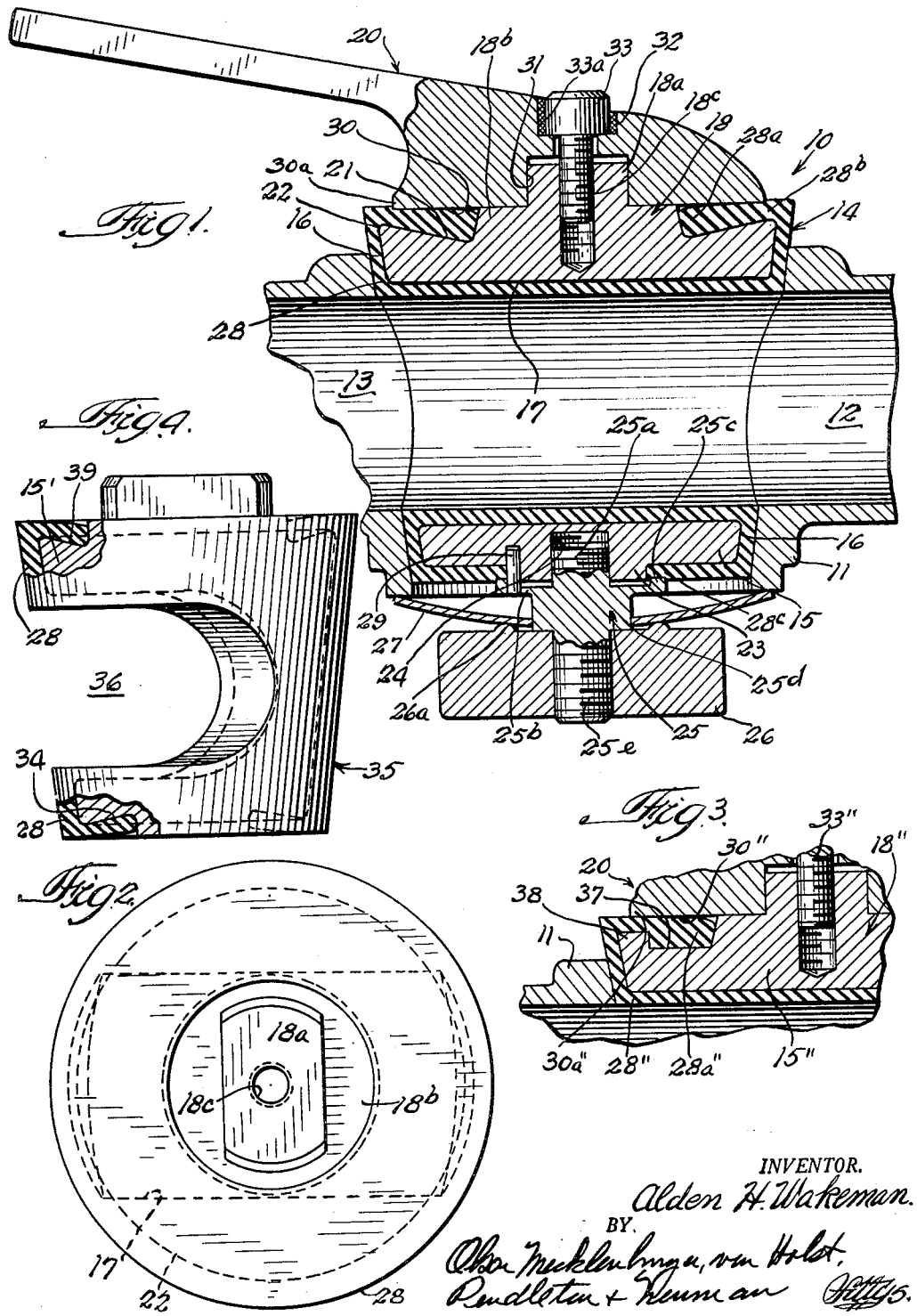

3,093,358
PLUG VALVE CONSTRUCTION
Alden H. Wakeman, Lake Mills, Wis., assignor to The Creamery Package Mfg. Company, Chicago, Ill., a corporation of Illinois
Filed Mar. 3, 1960, Ser. No. 12,613
2 Claims. (Cl. 251—309)

This invention relates to a valve construction and more particularly to a valve construction wherein the valve plug thereof is coated with a resilient corrosive-resistant material.

In valve constructions utilized in the processing of dairy products, for example, diligence must be exercised in thoroughly cleaning, at frequent intervals, the various parts of the valve which come in contact with the product being processed, so as to eliminate or materially reduce the hazard of product contamination. In the course of such cleaning, it is customary for the valve plug to be immersed in one or more strong cleaning solutions. The chemical compositions of these cleaning solutions are generally such that they deleteriously affect most metals (i.e., steel, aluminum, copper, etc.).

Because of the high pressures to which the valve plug is subjected under normal operaton, it has been found most desirable that the plug have a metallic core. From a practical and cost standpoint, the utilization of an inexpensive low-grade ferrous or aluminum material for this purpose is preferred. However, to overcome the corrosive effect on such core material due to the cleaning solution and, in some instances, the product itself, flowing through the valve, it is necessary to coat the exposed portions of the core with a suitable corrosive-resistant resilient material. While such coating for the most part overcomes the problem of corrosion, there is another problem which arises, namely, to provide an effective bond between the core and the coating, which would withstand the repeated washings and the high pressure to which the plug is subjected during operation.

Normally, in valves of the type in question, the valve plug offers considerable resistance to turning when assembled in the valve seat and, therefore, to accomplish this operation requires the utilizaton of an elongated rigid handle which is capable of imparting a large amount of turning torque to the plug. Because of this torque requirement, the handle is normally formed of a suitable metal and one which is not susceptible to the aforementioned corrosive problems. Furthermore, it has been found that in order to produce the necessary torque, there must be a metal-to-metal contact between the handle and the core. Thus, it is essential that a portion of the core contacted by the handle not be covered with the resilient coating material.

It is the bonding between the coating and core at the handle-engaging portion of the core, where the problem of resisting corrosion becomes most acute. In addition, the coating at this point is more susceptible to sliding outwardly relative to the core when the plug is assembled in the valve seat and subjected to the high operating pressures of the flowing product. It is apparent, therefore, that the handle, or means cooperating therewith, must serve several functions: (a) effect a seal between the handle and coating and thus prevent deleterious material from reaching the core boss; (b) help to increase the bond between the core and coating; and (c) facilitate the turning of the plug within the valve seat. In order to accomplish function (a), the handle remains assembled with the core during cleanup of the plug.

Various valve plugs have heretofore been provided but, because of design, are incapable of fulfilling all of the aforenoted requirements. For example, in certain instances the handle contacts the coating material in such a way as likely to cause tearing or rupturing of the coating material. In addition, the coating material is compressed by the handle over a relatively small area and is not effective in preventing sliding of the coating material relative to the core endface when the plug is in operation. By increasing the area of surface contact, high compressive forces are needed to seal the handle to the plug.

Thus, it is one of the objects of the present invention to provide a valve plug which is not beset with the difficulties of the prior art and is capable of adequately fulfilling the aforenoted requirements.

It is a further object of this invention to provide a valve plug which is inexpensive to produce, of sturdy construction, and efficient in operation.

It is a further object of this invention to provide a valve plug having a coating of resilient material applied to the core thereof, whereby the portion thereof applied to an endface of the plug is thicker in section inwardly of the outer periphery of the endface to produce a locking action of the material to the core; the resilient material being of such a character that, when molded, it shrinks on setting in proportion to the thickness and thus effects a relieved surface permitting sealing on the outer periphery only.

It is a still further object of this invention to provide a valve plug wherein a relatively small amount of compressive force need be applied by the handle to the coated endface of the core to provide an effective seal between the handle and the core coating.

Further and additional objects will appear from the description, accompanying drawing and appended claims.

In accordance with one embodiment of this invention, a rotatably mounted valve plug is provided comprising a core having a passageway formed therein which is angularly disposed relative to the rotary axis of said plug. The plug core is further provided with an endface having a boss formed thereon which is disposed coaxially with respect to the rotary axis of the plug. The portion of the core endface circumjacent the boss is recessed relative to the outer periphery of the endface. A resilient corrosive-resistant coating is applied to the core sidewalls, passageway surfaces and endface, except for the boss formed thereon. Overlying and compressively engaging the endface coating is a handle. The surface of the handle which compressively engages the endface coating is of planar configuration and the outer periphery thereof engages the resilient coating to produce an adequate seal. The thickness of the endface coating, when not in a compressed state, is greatest circumjacent the boss and in molding shrinks an amount greater than the peripheral portion to produce a relieved surface so as not to contact the planar surface of the handle in assembly.

For a more complete understanding of this invention, reference should be made to the drawing, wherein:

FIGURE 1 is a fragmentary vertical section view of a two-way valve construction showing the valve plug thereof in a flow position of adjustment;

FIG. 2 is a top plan view of the valve plug of FIG. 1, with the handle thereof removed;

FIG. 3 is a fragmentary vertical section view of the endface of a modified form of valve plug; and FIG. 4 is a side elevational view of another modified form of valve plug and having portions of the endfaces thereof partially in section.

Referring now to the drawing and more particularly to FIG. 1, an improved two-way type valve construction 10 is shown which comprises basically a valve seat 11 having inlet and outlet ports 12 and 13 formed therein, and a valve plug mounted for rotation about an axis substantially transverse to the axes of ports 12 and 13. The plug 14, in this instance, is formed of a metallic core 15 (preferably an aluminum material), which has substantially cylindrically-shaped tapered sidewalls 16 and a transverse passageway 17 formed therein for effecting communication between valve seat ports 12 and 13 when the plug is in one position of rotational adjustment.

The upper endface of the core 15, in this instance, is provided with a central boss 18 which is coaxially disposed with respect to the rotary axis of the plug. The boss 18, in this instance, includes an upper protruding portion 18a having a faceted or noncircular side surface and an annular-shaped base portion 18b which encompasses the protruding portion 18a. The portion 18a is provided with an axially disposed internally threaded opening 18c.

Removably secured to boss 18 and encompassing boss portion 18a is an elongated handle 20, to facilitate rotation of the valve plug subsequent to the latter being assembled within the seat 11. The structural details of handle 20 will be described more fully hereinafter.

The portion 21 of the endface of the core, which is disposed circumjacent the boss portion 18b, is recessed a substantial amount relative to the outer peripheral portion 22 of the endface. In the form of the valve plug shown in FIG. 1, the recess is effected through a substantially uniform taper commencing from the outer periphery of the endface toward the boss portion 18b.

It will be noted that inner portion 21 of the recess is considerably deeper than any other portion of the recess and thus an effective locking action is produced for the coating of resilient material 28 which is bonded to the core endface and fills such recess, when the handle 20 is secured to the core. This locking action will be described more fully hereinafter. The resilient coating material is preferably of a type wherein shrinkage thereof occurs during the molding thereof on the core and the amount of shrinkage is proportionate to the thickness of the material. Thus, due to the thickness differential in the endface coating, greater shrinkage of the coating occurs in the area surrounding boss portion 18b, whereby a slight relief is produced in the exposed surface of the endface coating and thereby less compressive force by the handle 20 is required on the exposed coating surface to effectuate a proper seal therebetween.

The opposite endface of the core is also provided with a centrally disposed boss 23 having an internally threaded opening 24 formed therein. Opening 24 is axially aligned with opening 18c and both openings are coaxially aligned with respect to the axis of rotation of the plug. Adjustably mounted within opening 24 is a threaded shank portion 25a of a stud piece 25. The piece 25 is provided with a central laterally extending flange 25b; the diameter of the flange is such that the outer periphery thereof projects beyond the perimeter of boss 23. The outer periphery of flange 25b is provided with an upwardly projecting bead 25c, the function of which will be described more fully hereinafter.

Extending downwardly from flange 25b is an enlarged unthreaded shank portion 25d. From the lower end of portion 25d projects a lower threaded shank portion 25e which is of reduced diameter, as shown more clearly in FIG. 1. Shank portion 25e is adapted to be accommodated by an exposed nut member 26. Enlarged shank portion 25d is disposed within an opening formed in a resilient saucer-shaped washer 27. The outer periphery of washer 27 contacts the underside of valve seat 11. The adjustable member 26 is provided with an annular bead 26a which is adapted to contact the exposed surface of washer 27 encompassing shank portion 25d. Thus, adjustment of member 26 on shank portion 25e will vary the force applied to the valve plug to anchor the same in valve seat 11.

The exposed portions of the core, such as the sidewalls 16, surface of the passageway 17, and the endfaces, except for the bosses formed thereon, are covered over with a resilient moldable corrosive-resistant coating 28. The need for such coatings, as aforenoted, is that normally the core is formed of a low-grade ferrous or aluminum material which is deleteriously affected by solutions used for cleaning the various valve parts or by the product which might flow through the valve. It will be noted, however, that the moldable coating material does not cover the bosses 18 and 23 formed at the opposing endfaces of the core; the reason for this will become apparent hereinafter. Because of the recessed configuration of the upper endface of the core, the portion of the coating 28a which surrounds annular boss portion 18b is of substantially greater thickness than the portion 28b of the coating which overlies the outer periphery 22 of the endface. This thickness differential between coating portions 28a and 28b remains whether the endface coating is under compression or not.

The handle 20, heretofore indicated as being secured to the upper endface of the core, is provided with a planar undersurface 30. Formed in undersurface 30 is an elongated transversely extending slot 31, which is adapted to accommodate boss portion 18a. A counterbored opening 32 is formed in the upper portion of the handle and terminates in slot 31. Opening 32 is adapted to accommodate an anchoring bolt 33, which has the shank thereof threaded into opening 18c of boss 18 and thus effectively lock the handle 20 onto core 15. Also, the bolt is effectively sealed to the handle by soldering 33a or any other suitable means. In many instances a large torque must be developed by handle 20 in order to rotate the valve plug 14 relative to seat 11 and, for this reason, a metal-to-metal contact is required between the handle and core; otherwise a resilient coating interface between the handle slot 31 and boss portion 18a would be eroded or worn in a short period of time. The surface 30 of the handle extending outwardly from slot 31 is of planar configuration and overlies a substantial portion of the endface coating, as noted in the drawing. The outer peripheral portion 30a of endface 30 initially contacts portion 28b of the molded coating, due to less shrinkage in the area than occurs in the thicker coating inwardly of the core, and cooperated therewith to produce an effective seal therebetween, without a large amount of compressive force being exerted by peripheral portion 30a on the coating during assembly of the handle on the boss. Because of the greater thickness of the coating portion 28a overlying recess portion 21, and the relatively small clearance formed between handle surface 30 and endface periphery 22, the coating material will be effectively locked in place.

A locking recess 34 (see FIG. 4) may also be formed in the lower endface of the core 15' of modified valve plug 35 or in the lower endface of the core 15 of plug 14. With such a construction, however, the flange 25b of stud piece 25 would have to be of greater diameter so as to compressively engage the peripheral portion of the lower endface coating, such as is effected by the handle surface 30 shown in FIG. 1. Furthermore, the flange bead 25c could be eliminated.

The modified valve plug 35 is suitable for use in either a two-way or three-way type valve construction by reason of the peripheral cavity 36 formed in the sidewall of the plug. The configuration of the upper endface 39 of core 15' is preferably the same as that of core 15.

The coating 28, which may be of a moldable resilient material, is bonded to the metallic core in the conventional manner; however, because of the strong character of the cleaning solutions used in instances where the valve is employed in food processing operations, it is necessary to protect the bonding between the coating and core, particularly at the areas adjacent the endface bosses 18 and 23, and this is accomplished by the handle 20 and stud piece 25, respectively. The handle 20 and stud piece 25 are formed of a suitable metal which is not adversely affected by such cleaning solutions and, therefore, when the valve plug is disassembled from the seat 11 for purposes of cleaning, the handle and stud piece will remain assembled on the core.

The bead 25c, heretofore described as being formed on the flange 25b of stud piece 25, is adapted to compressively engage the coating portion 28c which is circumjacent the boss 23. Greater or lesser compressive force may be exerted on coating portion 28c by adjusting the stud member within opening 24. Once the stud member had been properly adjusted, it is held in place by a locking pin 29 which projects through the flange 25a into the core 15.

FIG. 3 illustrates a modified form of core 15″, in which the portions thereof corresponding to like portions in core 15 are numbered accordingly, but with a double prime mark (″) following the number. The upper endface of the core 15″, in this instance, has a slightly different shaped recess 37 formed therein, in that rather than having the recess uniformly taper inwardly from the outer periphery of the core, it is at a uniform depth throughout. The outer periphery of recess 37 terminates near the outer periphery of the endface and forms an upwardly extending ledge 38 in the endface. The ledge 38 cooperates with the periphery 30a″ of the handle undersurface to form a clearance which is substantially smaller in cross-section than the thickness of the coating 28a″ which surrounds the center boss 18″ formed in the endface.

With any of the forms of valve plug, effective retention of the coating of the core endface is maintained because of the inability of the coating material to compress to such an extent as to pass through the clearance between the outer peripheries of the core and handle undersurface. Furthermore, because a relatively large area of the endface coating is being compressed a relatively small amount by the handle undersurface 30, the likelihood of the coating being ruptured or torn is minimized.

Thus, it will be seen that a valve construction has been provided which is inexpensive to form, sturdy and compact in construction and effective in operation. Furthermore, a valve structure has been provided which is acceptable for use in systems wherein the matter of product contamination is of utmost importance.

While several embodiments of this invention have been shown above, it will be understood, of course, that the invention is not to be limited thereto, since many modifications may be made and it is contemplated, therefore, by the appended claims, to cover any such modifications as fall within the true spirit and scope of this invention.

I claim:
1. In a valve construction having a valve seat provided with a pair of relatively spaced ports; a valve plug rotatably mountable within such valve seat, said plug comprising a rotatable core having tapered side walls, a passageway formed in said core and having the opposite ends of said passageway terminating at spaced locations on said tapered side walls and being registrable with the ports of such valve seat when said core is in one position of rotatable adjustment, and an end face provided with an axially disposed boss and a recessed portion having the inner periphery thereof spaced from said boss; the segment of said end face intermediate said boss and the inner periphery of said recessed portion forming a supporting surface; a resilient moldable coating having a predetermined shrinkage property, overlying continuously the side walls, the interior surfaces of the passageway, and all of said end face of said core except for said end face boss and supporting surface; the depth of recess of said recessed portion relative to the plane of said supporting surface being greatest adjacent the inner periphery of said recessed portion, gradually diminishing toward the outer periphery, and being such as to provide a relieved exposed coating surface; and a removable end piece mounted on said end face and having a planar surface engaging said end face supporting surface and overlying the exposed surface of said end face coating; the outer periphery of said end piece planar surface compressively engaging the end face coating overlying said end face outer periphery; the thickness of said end face coating being greatest at said recessed portion inner periphery and being greater than the spacing between the outer periphery of said end piece planar surface and the outer periphery of said core end face whereby the compressibility of the portion of said end face coating adjacent said recessed portion inner periphery is such that such end face coating portion is impassable relative to said spacing, said end piece effecting progressively greater compression forces against said end face surface coating as the outer periphery of said core end face is approached.

2. The valve construction of claim 1 in combination with adjustable means for engaging a second end face oppositely disposed to the first mentioned end face; said adjustable means cooperating with said valve seat to effect anchoring of said plug within said valve seat.

References Cited in the file of this patent

UNITED STATES PATENTS

| | | |
|---|---|---|
| 1,561,867 | Larsen | Nov. 17, 1925 |
| 2,593,740 | Faust | Apr. 22, 1952 |
| 2,745,631 | Shellman | May 15, 1956 |
| 2,832,563 | Walsh | Apr. 29, 1958 |
| 2,903,235 | Rodgers | Sept. 8, 1959 |